(12) United States Patent
Meyer et al.

(10) Patent No.: US 7,025,467 B2
(45) Date of Patent: Apr. 11, 2006

(54) OUTSIDE, VEHICLE REARVIEW MIRROR SYSTEM FOR BACKING

(76) Inventors: Lee G. Meyer, 17462 E. Powers Dr., Centennial, CO (US) 80015-3046; Alla Meyer, 17462 E. Powers Dr., Centennial, CO (US) 80015-3046

( * ) Notice: Subject to any disclaimer, the term of this patent is extended or adjusted under 35 U.S.C. 154(b) by 25 days.

(21) Appl. No.: 10/601,436

(22) Filed: Jun. 23, 2003

(65) Prior Publication Data

US 2004/0257684 A1 Dec. 23, 2004

(51) Int. Cl.
*G02B 5/08* (2006.01)
*G02B 7/18* (2006.01)

(52) U.S. Cl. .................. 359/843; 359/865; 359/877

(58) Field of Classification Search ................ 359/841, 359/843, 850, 855, 865, 866, 872, 877
See application file for complete search history.

(56) References Cited

U.S. PATENT DOCUMENTS

| | | | |
|---|---|---|---|
| 3,826,563 A * | 7/1974 | Davis | 359/865 |
| 4,022,520 A * | 5/1977 | Scifres | 359/855 |
| 4,838,577 A | 6/1989 | Kawai et al. | |
| 4,890,907 A | 1/1990 | Vu et al. | |
| 4,936,671 A | 6/1990 | Kaspar | |
| 5,052,792 A | 10/1991 | McDonough | |
| 5,337,190 A | 8/1994 | Kogita et al. | |
| 5,497,273 A | 3/1996 | Kogita et al. | |
| 5,871,275 A | 2/1999 | O'Farrell et al. | |
| 6,412,962 B1 * | 7/2002 | Kaspar | 359/850 |
| 6,474,853 B1 | 11/2002 | Pastrick et al. | |
| 2003/0214738 A1 * | 11/2003 | Yamada et al. | 359/877 |

FOREIGN PATENT DOCUMENTS

| | | | |
|---|---|---|---|
| GB | 2194763 | * | 3/1988 |
| JP | 58004647 | * | 1/1983 |

* cited by examiner

*Primary Examiner*—Mark A. Robinson
(74) *Attorney, Agent, or Firm*—Lee G. Meyer, Esq.; Meyer & Associates, LLC

(57) ABSTRACT

An outside mirror system for a vehicle includes at least one exterior mirror having at least a pair of reflective elements, a positioning device for selectively positioning each reflective element independently one from the other, wherein one segment is automatically, independently, downwardly directed on an area adjacent the side of the vehicle when the vehicle is placed in reverse. A housing for the reflective elements can also be provided. A control is responsive to the vehicle reverse gear selector being in reverse gear for causing the positioning device to independently position one reflective element to a downwardly tilted position. The pair of reflective elements is remotely adjusted, in tandem, for driver rearward viewing when the car is in forward motion and only provides a split view during backing. Once the backing maneuver is complete the downward directed element returns to its original position.

22 Claims, 1 Drawing Sheet

OUTSIDE, VEHICLE REARVIEW MIRROR SYSTEM FOR BACKING

BACKGROUND OF THE INVENTION

1. Field of the Invention

The present invention relates generally to vehicle, remotely controlled outside rear-view mirrors; and, more particularly, to remote control, exterior review mirror systems for facilitating vehicle backing.

2. Description of Related Art

Conventional, exterior or "outside" vehicle mirrors have come into prominence, on both the driver and passenger side, to provide the driver an enhanced "rearward view" in addition to the traditional interior rearview mirror. These mirrors, which are mounted external the vehicle, usually proximate the front doors, are used to view straight rearward of the automobile during normal, forward operation such as when changing lanes on a freeway or overtaking and passing cars on two, as well as multi-lane roads. They are also useful in backing.

Since these devices are mounted to the exterior of the vehicle, they have become remotely adjustable using a control, mounted inside the vehicle, proximate the drivers side. Some are powered. In this case, the switch remotely controls the mirror adjustment, by for example, electric tilting motors. In this manner a driver entering the vehicle can use the electronically switched motor to tilt the exterior mirror(s), one at a time, up or down (about a horizontal axis), or to either side (about a vertical axis) to get an "adjusted rearward view", directly back along either side of the vehicle. The position of each exterior mirror can then be locked for driving.

Recently, luxury cars, such as Cadillac, have employed memory circuits, which adjust seats, radio, and mirrors to a preset position when a driver, identified by a chip on the specific ignition key, places the key in the ignition. Thus, each driver of the vehicle carries his or her unique key, such that all of the above adjustments are reset to his or her setting by placing the key in the ignition circuit. In this manner, outside mirror "readjustment" is automatic when a specific driver's key is placed in the ignition.

"Backing" a motor vehicle is one of the most dangerous and accident-prone maneuvers a driver can attempt. Conventional exterior mirrors, which provide a view straight backward of the vehicle, are not of much assistance to the driver when reversing the vehicle into tight spaces, such as when parking. During parking maneuvers, including rearwardly maneuvering the vehicle into a parallel parking space, it is desirable to be able to observe, through the external rearview mirrors, impediments to the downward side of the vehicle, including adjacent vehicles, elevated curbs, posts, and the like.

Recently, in order to facilitate such maneuvers as parallel parking, the passenger side, outside rearview mirror has been equipped with a linkage, which angels the mirror downward, such that the driver has a clear view of the curb and other obstacles on the ground proximate the passengers side of the vehicle to facilitate parallel parking. This "downward tilt" is affected automatically when the car is placed in reverse. This is sometimes known as a "power tilt mirror."

A power tilt mirror always responds to the vehicle being placed in a reverse gear by rotating the exterior mirror, or mirrors, (about a horizontal axis) to a downwardly tilted orientation. This allows the driver to observe areas proximate the ground and to the side of the vehicle, rather than those that are principally the conventional rearward view.

The tilting of the mirror may be accomplished by a separate tilt mechanism provided specifically for the power tilt function, or may be provided by programming the memory function of a conventional electrically driven remote positioning device, which responds to the vehicle being placed in reverse gear. Upon placing the vehicle in drive, neutral or park position the mirror returns to its previous adjustment, which has been memorized by the circuit.

Since this alteration of the passenger's side outside rearview mirror happens automatically when the vehicle is placed in reverse, the driver cannot see "straight rearward" from the passenger's side rearview mirror when the vehicle is in reverse. Thus, when backing from a parking space in a parking lot, backing from a garage, or the like, the driver is virtually "rearwardly blind" on the passenger's side, leaving a dangerous blind spot. Cars approaching from the side and rearward of the driver cannot be seen.

Additionally, with the advent of "one-way street parking" which allows, at least passenger cars and SUVs, to parallel park on either side of the street, the "driver's side" outside mirror has not heretofore been capable of this "automatic downward tilt" when the vehicle is placed in reverse. Even if this were available, this would place both the passengers and the drivers outside mirror in a downward view when backing. This would effectively blind the driver from viewing directly rearward events from either outside mirror. Therefore, when backing from a parking lot space, vehicles traversing the isles of the lot, behind the backing vehicle would not be visible to the backing vehicle driver, even though, such traversing vehicles have the right of way.

Thus, the prior art is both inconvenient and dangerous when attempting certain backing maneuvers. One way to alleviate this problem would be to provide a driver's side control, which would allow the driver to selectively engage this downward view for either or both of the outside mirrors. This, however, still limits the direct rearward view of a driver in backing, forcing the driver to choose between the view "straight rearward," or only the "downward view".

It would be advantageous to have a segmented or partitioned exterior mirror, on the driver and/or the passenger side of the vehicle, wherein both segments provide a planer rearward view during normal driving, but a first segment or reflective portion would maintain the previously driver adjusted "rearward view" and the second would automatically tilt downwardly when the vehicle was placed in reverse.

SUMMARY OF THE INVENTION

According to the invention, a segmented, outside rearview mirror system for a vehicle offers the driver a complete and clear view of both the direct "rearward view" as well as a "downward view" of the lower rearward portions of his vehicle during vehicle backing. There is provided an outside mirror assembly having at least a pair of reflective surfaces, adapted to be supported exterior the vehicle (either on the driver or the passenger side or both), such that upon putting the vehicle in reverse a first reflective surface remains in its original position to provide a full rearward view, while a second reflective surface is, independently, directed downward to provide a downward view of the curb or other lower obstructions, proximate the side of the vehicle. The mirror assembly can comprise more than one first and second reflective surface as is desired for the vehicle.

The inventive exterior mirror system for a vehicle includes at least a first exterior mirror element having a reflective surface, at least a second exterior mirror element having a reflective surface, proximate the first, a first positioning device for selectively positioning the first and second mirror elements, in tandem, to provide the vehicle driver a view directly rearward of the vehicle from both elements, and a second positioning device, which may be the same as the first, for selectively positioning the second mirror element in a generally downwardly, tilted position to provide the driver a downward view of the area, including the ground, adjacent the side of the vehicle from the second element during backing. Advantageously, the second positioning device is actuated in response to the vehicle being placed in reverse gear. In one embodiment, a control is responsive to the vehicle reverse gear selector being placed in reverse gear, which causes the positioning device to position the second mirror element to a downwardly tilted position and then return to its previous position when the reverse gear selector is removed from the reverse gear position.

In accordance with the exterior mirror system of the instant invention, the mirror elements can be mounted on either the passenger, or the driver side (or both). In one embodiment, the first and second reflective surfaces abut one another so that the mirror elements provide a reflective surface segmented along one of their horizontal common sides. In this embodiment, the two surfaces can be housed in a single mirror housing. Advantageously, the first and second elements are hinged along their segmented common side, but need not be.

In another embodiment, the reflective elements comprise two stacked mirror elements, configured such that both mirror elements are able to be remotely positioned, in tandem, for rearward viewing while the vehicle is in forward motion, but configured such that when the vehicle is placed in reverse, the lower mirror element, in the tandem arrangement, automatically focuses downward. This lower mirror element automatically returns to its previous viewing position when the vehicle is returned to forward operations.

A method for providing a vehicle operator a simultaneous, rearward view and downward view along the side of the vehicle, from a segmented exterior rearview mirror assembly while backing is also provided. The method comprises the steps of initially selectively positioning a first and second mirror segment, each independently pivotally supported on the vehicle, to provide the vehicle operator a planer view directly rearward of the vehicle from both elements, then for backing selectively positioning the second mirror element in a generally downwardly, tilted position to provide the operator a downward view of the area adjacent the lower side of the vehicle while maintaining the first in its initial position and then selectively re-positioning the second mirror element to its first position such that the vehicle operator is provided a planer view directly rearward of the vehicle from both said elements once the backing maneuver is terminated.

BRIEF DESCRIPTION OF THE DRAWINGS

The following drawings form part of the present specification and are included to further demonstrate certain embodiments. These embodiments may be better understood by reference to one or more of these drawings in combination with the detailed description of specific embodiments presented herein.

DESCRIPTION OF ILLUSTRATIVE EMBODIMENTS

Figure 1:
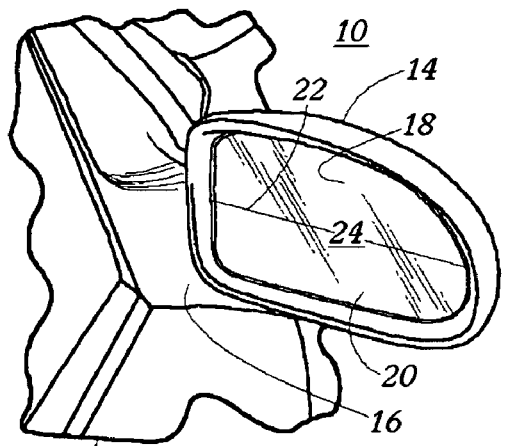
FIG. 1 is a perspective view of the mirror system mounted on a motor vehicle in accordance with the instant invention with both mirror elements in a single plan looking rearward.

The outside, remote rear-view mirror system presents the driver an efficient, full, rear-view during normal driving operations from both mirror elements, in tandem, as if they were a single reflective surface. Thus, during normal driving, i.e. not backing up, the mirror elements act as a standard exterior rearview mirror. In this mode, even though the mirror elements can move independently, they can be adjusted in a conventional manner as a single reflective surface. During backing, however, one surface is tilted to view, for example, the curb, while the other remains in its previous position providing the driver an efficient rear-view. Upon completion of the backing maneuver, the reflective surface that has been tilted to view the curb, returns to its previous position such that both surfaces once again present the driver an efficient, full, single rear-view. In this manner the driver, while backing can see both the normal rearward view, as well as the downward view.

Remotely controlled, adjustable exterior vehicle mirrors are well known in the art as previously discussed. These exterior mirrors are remotely controlled to allow individual drivers to adjust the driver side and/or the passenger side exterior mirror from inside the vehicle. The external mirror system having at least two mirror elements of the instant invention advantageously uses this adjustment system for remotely controlling the inventive mirror system when the mirrors act as a single reflective surface for normal reward viewing. However, as shown in the accompanying drawings and as further described below, the dual function, segmented, outside, remote, vehicle rearview mirror of the instant invention, utilizes a means for independently tilting, at least one mirror element to afford the driver a view of the ground and objects proximate the side of the vehicle in the vicinity of the rear wheel. This can be done by either modifying the conventional adjustment system or supplying a separate tilting mean for the mirror element, which is downwardly tilted during backing. Thus, in accordance with the invention, this standard system for adjusting conventional exterior vehicle mirrors is not shown in the accompanying drawings; however, it will be realized by the skilled artisan that an adoption of this conventional adjustment system can be utilized to affect the independent tilting of the mirror elements in accordance with the instant invention. Such system is incorporated herein by reference.

In any event, the adjusting or pivoting system for adjusting each mirror element, has the ability to act independently during backing, irrespective the positioning means used to accomplish the adjusting of both mirror elements, in tandem, for normal driving and the downward tilting of at least one mirror element while backing. A separate tilting system for the mirror element, which is to be tilted downward, is also enabling of the inventive concept. In either case, advantageously, the adjusting system is capable of returning the downwardly pivoted element to its previous position once the backing maneuver is completed.

Figure 3:
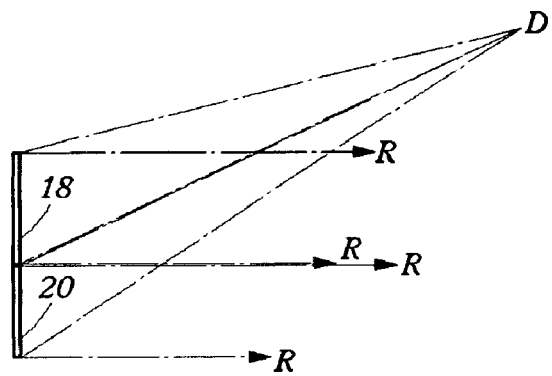
FIG. 3 is a sectional illustration of the positioned mirror elements in FIG. 1 showing the driver's vision.

In accordance with the present invention, there is provided an exterior mirror assembly, mounted on the driver and/or the passenger side of the vehicle comprised of at least two mirror elements, each having a reflective surface and independently movable or pivotal (in the horizontal or the vertical axis), one with respect to the other. In accordance with the invention, as shown in FIG. 1, a first configuration of the mirror system of the instant invention is comprised of an a planer alignment of the mirror elements to affect a standard "full" rearward view by the driver is depicted in FIG. 3. When the elements are positioned in this planer configuration, they can be adjusted, in tandem, by for example, the remote means previously described, as if the elements were a single reflective surface.

Figure 2:
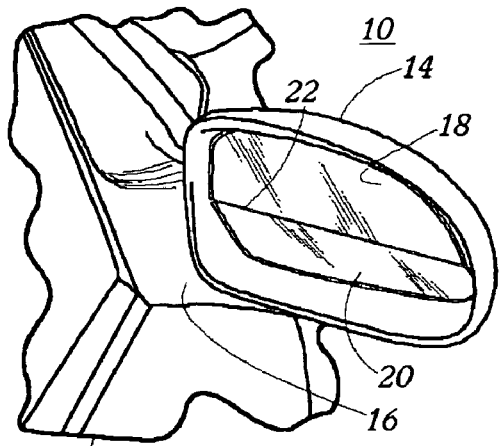
FIG. 2 is a perspective view of the mirror system mounted on a motor vehicle in accordance with the instant invention with the upper mirror element looking rearward and the lower mirror element looking downward.
Figure 4:
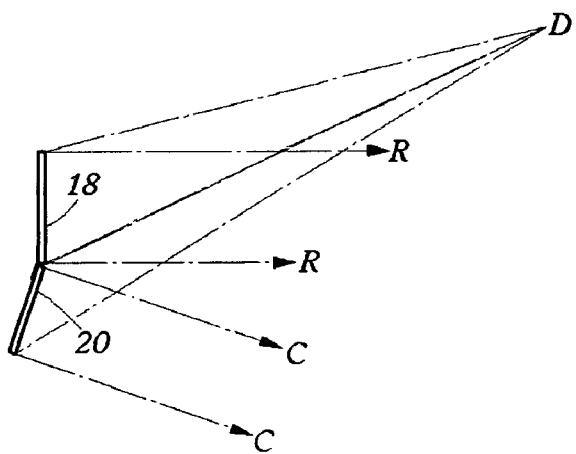
FIG. 4 is a sectional illustration of the positioned mirror elements in FIG. 2 showing the driver's vision.

However, when the vehicle is placed in reverse for backing, at least one mirror element is tilted downward to the position, as shown in FIG. 2, such that the tilted element gives the driver a downwardly directed view of the side of the vehicle, for example, proximate the rear wheel. The driver's view through each of the mirror elements while backing is illustrated in FIG. 4. As can be seen, the driver has a view both rearwardly, as in the conventional driving position, as well as downwardly to view obstacles proximate the ground on the side of the vehicle.

Advantageously, this system is employed on both the driver, and the passenger, side to give the driver the enhanced view on both sides of the vehicle while backing. The rearward view, while backing, using the instant invention is advantageous, not only in parallel parking the vehicle, but also in backing from, for example, a garage where small children may ride toys into the path of the backing vehicle. This system allows the driver to see both events and obstacles proximate the lower portion of the vehicle, as well as oncoming traffic, on either side of the vehicle.

In an illustrative embodiment, the outside rearview mirror system comprises a single unit having at least two mirror elements, pivotally mounted in at least one housing, adapted for being mounted to a body of the vehicle on the driver or passenger side. It will be realized by the skilled artisan that many configurations of the planer reflective elements are possible within the scope of the invention. A positioning motor is coupled to the at least one mirror element through a link. A current supply circuit for the positioning motor can include a reverse switch for reversing the rotation of the positioning motor or a mechanical repositioning means. In one embodiment, a gear selector or indicator for reverse gear is coupled to the switch for switching and reversing at least one of the mirror elements, which is coupled to a preset displacement restriction device for the rotations of the link. The driver is thus relieved from manipulation of the mirror element to a downwardly tilted position, allowing the desired view to the downward area proximate the side of the vehicle, when selecting the reverse gear with the gear selector. Advantageously, when the vehicle is placed in reverse one mirror element automatically assumes the preset tilted position, while the other mirror element remains in its rearward viewing position; and then returns to the initial position automatically, when the gear selector is removed from the reverse gear selection.

Turning now to the drawings, in which similar reference characters denote similar elements throughout the several views, the Figures illustrate an embodiment of the remotely controlled, outside, vehicle rearview mirror assembly 10 for a motor vehicle 12 consisting of an exterior side-view mirror housing 14 conventionally attached to the motor vehicle 12 by means of strut 16. Pivotally attached to exterior side-view mirror housing 14 are mirror elements 18 and 20, each having a reflective surface. Mirror elements 18 and 20 are able of adjustment, in tandem, by means of a driver actuated mirror adjustment system (not shown), and are able of movement independent one to the other about a midline 22. It will be realized that if the two elements 18 and 20 are hinged along midline 22, their movement with respect to one another is restricted to a single axis.

As shown in FIG. 1, mirror elements 18 and 20 are positioned to form a single planer reflective surface 24. This arrangement of the mirror elements operates as a conventional, remotely controlled, vehicle exterior side mirror when the vehicle is operated other than in reverse. As shown in FIG. 3, a driver "D" adjusts mirror elements 18 and 20, in tandem, to show a rearward view "R" from the continuous planer reflective surface as in a conventional exterior vehicle rearview mirror.

Turning to FIG. 2, there is shown the outside, remote, vehicle rearview mirror assembly 10, as in FIG. 1, for a motor vehicle 12 consisting of an exterior side-view mirror housing 14 attached to the motor vehicle 12 by means of strut 16. As shown in FIG. 2, mirror elements 18 and 20 are pivotally attached to exterior side-view mirror housing 14 such that upon placing the vehicle in reverse, mirror element 18 remains in its previously adjusted position showing a rearward view to the driver, while mirror element 20 is pivoted downwardly along midline 22 to show a view proximate the ground toward the rear wheel of motor vehicle 12 (not shown) along the vehicle side.

As set forth in FIG. 4, in accordance with the configuration of FIG. 2, the driver "D" views by means of mirror element 18 a rearward view "R" which is the same as that seen by the driver reflected in mirror element 18 of FIG. 3. Driver "D" views by means of downwardly positioned mirror element 20 downwardly rearview "C" (curb). As was previously described, the configuration shown in FIG. 4 is assumed automatically when the vehicle is to maneuver backward by downwardly tilting mirror element 20. The control for this automatic configuration can be triggered by linkage to the gearshift lever, for example. Thus, the outside, remote, vehicle rearview mirror assembly 10 of FIG. 1 is configured as shown in FIG. 2 by moving the vehicle shift lever into the "reverse" position.

Once backing is complete and the reverse selector lever is placed in a position other then reverse, mirror element 20 returns to its previous position as shown in FIG. 1 yielding a view to driver "D", as shown in FIG. 3. In accordance with one embodiment, the mirror elements 18 and 20 are beveled along their common edge, and hinged. This provides an apparent seamless structure to the driver when the outside, remote, vehicle rearview mirror assembly 10 is used in a conventional manner as depicted in FIG. 1, but restricts the movement of mirror element 20 to a single plan in reference to mirror element 18.

Tiltable mirror element or segment 20 is adapted for positioning at two or more mirror positions by means of a suitable adjusting system, for example, a motor mechanism such as an electric solenoid motor, vacuum, or pneumatic actuator or the equivalent, as well known in the art, to remotely position exterior mirrors. For example, the normal position of the mirror element 20 is maintained when the solenoid motor is de-energized and the downward position when the solenoid motor is energized. A spring or resilient member, for example, is useful in returning the mirror to its previous position when the solenoid motor is de-energized.

The apparatus may incorporate an electric circuit for the solenoid motor, which includes a switch that is coupled with the electrical circuitry of the vehicle and is activated by the gearshift selector position. Upon placing the selector in reverse, the motor circuit is energized, thereby accomplishing movement of the mirror segment from a normal position to, for example, a preselected downward mirror position. Both, the normal and preselected positions of the outside, remote, vehicle rearview mirror assembly 10 may be adjusted to suit the needs of the vehicle operator as previously described.

The mirror assembly of the present invention, thus, incorporates an adjustable stationery mirror element 18, which is capable of movement within the housing for the primary purpose of adjusting the exterior rearward view mirror position as desired by the operator of the vehicle. Adjacent to the stationery mirror segment there is mounted a pivotal mirror section or sections which is capable of movement from a normal position in generally coplanar registry with the adjustable stationery mirror to a preselected position which is angulated with respect to the stationery mirror as previously described and set forth in the Figures.

The solenoid motor or other suitable mechanism is operatively interconnected to the mirror element 20. Upon actuation of the shift lever of the vehicle to reverse position, a control switch energizes the motor circuit and activates the electric motor, which shifts the mirror element 18 to its preselected secondary downward position.

Figure 5:
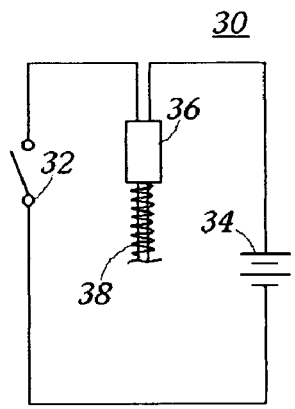
FIG. 5 is a schematic diagram of the electrical circuitry for the inventive system, which tilts the mirror element down in response to the vehicle being placed in reverse.

Exemplary of a suitable circuit is circuit 30, as shown in FIG. 5. In accordance with this embodiment, circuit 30 is provided for activating the mirror element 20 (see FIG. 1) to pivot it into its downwardly position for backing. The pivot can be any appropriate angle and can involve pivoting about both the vertical and horizontal axis to accomplish the desired view. The actual pivot angle ($\theta$) is, advantageously, preset. This pivot, which is usually from about 22 to about 27 degrees down (horizontal axis) can be preset so that the movement is automatic. However, it can be adjustable by the driver in a manner similar to that explained above for a conventional remote controlled, outside mirror and then locked in that position for future backing use for that driver. The circuit 30 will activate the mirror element 20 (see FIG. 1) within the housing 14 (see FIG. 1) to direct the mirror element downwardly to view to rear of the motor vehicle 12 proximate the ground, allowing a driver to see the a curb view from mirror element 20 (see FIG. 1) during parking of the motor vehicle 12.

The circuit 30 includes a switch 32 on gearshift lever (not shown). A battery 34, which is advantageously the vehicle battery, is electrically connected to the switch 32. A pivoting mechanism 36, which can be a solenoid motor or the like, is electrically connected between the switch 32 and the battery 34 and is mechanically connected to the movable mirror element 20 (see FIG. 1). Placing the gearshift lever into reverse will close the switch 32 activating pivoting mechanism 36 to place the mirror element into the downwardly tilted position. A spring 38 repositions mirror element 20 to its original position as shown in FIG. 1, when the pivoting mechanism 36 is de-energized by opening switch 32 by moving the gearshift lever (not shown) out of reverse.

As can be seen from the drawings, the basic concepts of the present invention may be embodied in many different ways using readily available mechanical/electric components or with specialized units created specifically for this purpose. The invention can be installed when a vehicle is initially built or as a retrofit.

The foregoing discussions and examples describe only specific embodiments of the present invention. It should be understood that a number of changes might be made, without departing from its essence. In this regard, it is intended that such changes—to the extent that they achieve substantially the same result, in substantially the same way—would still fall within the scope and spirit of the present invention.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An exterior rearview mirror system for a vehicle comprising:
   (a) a first mirror element having a reflective surface adapted to be pivotally supported on said vehicle;
   (b) a second mirror element having a reflective surface, proximate the first, adapted to be pivotally supported on said vehicle;
   (c) a first positioning device for selectively positioning said first and second mirror elements, in tandem, to provide the vehicle operator a planer view, directly rearward of the vehicle, from both said elements; and,
   (d) a second positioning device, for selectively pivoting said second mirror element in a generally downwardly, tilted position about an axis formed between said first mirror element and said second mirror element to provide the operator a downward view of the area adjacent the lower side of the vehicle from said second element during backing.

2. The exterior rearview mirror system for a vehicle of claim 1 wherein said second positioning device returns said second mirror element to its original position to provide the vehicle operator a planer view, directly rearward of the vehicle, from both said elements when the vehicle resumes normal operation.

3. The exterior rearview mirror system for a vehicle of claim 1, wherein said second positioning device is actuated in response to the vehicle being placed in reverse gear.

4. The exterior rearview mirror system for a vehicle of claim 3 wherein said second positioning device returns said second mirror element to its original position to provide the vehicle operator a planer view, directly rearward of the vehicle, from both said elements when the vehicle is removed from reverse gear.

5. The exterior rearview mirror system for a vehicle of claim 1 wherein a control is responsive to the vehicle reverse gear selector being placed in reverse gear, which causes said second positioning device to position the second mirror element to a downwardly tilted position.

6. The exterior rearview mirror system for a vehicle of claim 5 wherein said second positioning device returns said second mirror element from a downwardly tilted position to its previous position when the reverse gear selector is removed from the reverse gear position.

7. The exterior rearview mirror system for a vehicle of claim 1 wherein said the first and second mirror element abut one another so that the mirror elements provide a reflective surface segmented along one of their horizontal common sides.

8. The exterior rearview mirror system for a vehicle of claim 7 wherein, said first and second elements are hinged along their common side.

9. The exterior rearview mirror system for a vehicle of claim 1 wherein said the two elements are adapted to be pivotally supported in a single mirror housing which is adapted to be supported on said vehicle.

10. The exterior rearview mirror system for a vehicle of claim 1 wherein said first and second mirror elements comprise two spaced apart, stacked reflective surfaces, configured such that both mirror elements are able to be remotely positioned, in tandem, for rearward viewing while the vehicle is in other than in reverse, but configured such that when the vehicle is placed in reverse, the lower mirror element, in the tandem arrangement, is able of being automatically focused downward.

11. The exterior rearview mirror system for a vehicle of claim 10 wherein said lower mirror element is able to be returned to its original position for rearward viewing when said vehicle is removed from reverse gear.

12. An exterior rearview mirror system to be supported on a vehicle comprising:

first and second mirror elements, configured such that both mirror elements are able to be remotely positioned, in tandem, for rearward viewing while the vehicle is not in reverse gear, but configured such that when the vehicle is placed in reverse gear, the lower mirror element, in the tandem arrangement, is able of being automatically pivoted downward about an axis formed between said first mirror element and said second mirror element.

13. The exterior rearview mirror system for a vehicle of claim 12 wherein said lower mirror element is able to be returned to its original position for rearward viewing when said vehicle is removed from reverse gear.

14. The exterior rearview mirror system for a vehicle of claim 12 wherein said first and second elements comprise two spaced apart, stacked mirror elements.

15. The exterior rearview mirror system for a vehicle of claim 12 wherein said the first and second mirror elements abut one another so that the mirror elements provide a reflective surface segmented along one of their horizontal common sides.

16. The exterior rearview mirror system for a vehicle of claim 15 wherein, said first and second mirror elements are hinged along their segmented common side.

17. The exterior rearview mirror system for a vehicle of claim 12 wherein said first and second mirror elements are adapted to be pivotally supported in a single mirror housing which is adapted to be supported on said vehicle.

18. An automatically positionable mirror assembly for vehicles comprising:
(a) a mirror housing adapted to be supported on said vehicle;
(b) a segmented mirror adapted to be pivotally supported by said mirror housing comprising a first mirror segment adapted to be pivotally supported within said housing and a second mirror segment, adapted to be pivotally supported within said housing, independently of said first mirror segment, wherein said first and second mirror segments are adjustable in concert to provide a rearward view, as if they were a single reflective element, and, wherein said second mirror segment is pivotable about an axis formed between said first mirror segment and said second mirror segment, relative said first mirror segment, at a first preselected position which provides a rearward view with said first mirror segment as if they were a single reflective element and a second preselected position which provides a downward view of the area adjacent the lower side of said vehicle;
(c) a motorized positioning device operatively connected to said second mirror segment for moving said second mirror segment between said first preselected position and said second preselected position; and,
(d) a control circuit interconnected between said motorized positioning device and an energy source such that upon placing the vehicle in reverse gear said motorized positioning device causes movement of the second mirror segment from said first preselected position to said second preselected position.

19. The automatically positionable mirror assembly for vehicles of claim 18, wherein said control circuit, upon removing said vehicle from reverse gear, causes said motorized positioning device to move the second mirror segment from said second preselected position to said first preselected position.

20. A method for providing a vehicle operator a simultaneous, rearward view and downward view along the side of the vehicle, from a segmented exterior rearview mirror assembly while backing comprising the steps of:
(a) selectively positioning a first and second mirror segment, each independently adapted to be pivotally supported on said vehicle, to provide the vehicle operator a planer view directly rearward of the vehicle from both said elements; and,
(b) selectively positioning the second mirror element in a generally downwardly, tilted position about an axis formed between said first mirror segment and said second mirror segment to provide the operator a downward view of the area adjacent the lower side of the vehicle from the second element during backing.

21. The method of claim 20 comprising the further step of selectively re-positioning the second mirror element to its first position such that the vehicle operator is provided a planer view directly rearward of the vehicle from both said elements upon completion of backing.

22. An automatic exterior rearview mirror assembly to facilitate backing a motor vehicle comprising:
(a) a mirror housing adapted to be supported on the automotive vehicle;
(b) at least one first mirror element adapted to be pivotally supported on said mirror housing;
(c) at least one second mirror element, proximate the first, adapted to be pivotally supported on said mirror housing;
(d) at least one positioning device, remotely controlled,
  (i) for selectively positioning said at least one first and the at least one second mirror elements, in tandem, to provide the vehicle driver a view directly rearward of the vehicle from both said elements when the vehicle is not in reverse gear;
  (ii) for selectively positioning said at least one second mirror element about an axis formed at the interface between said first mirror element and said second mirror element in a generally downwardly, tilted position to provide the driver a downward view of the area, adjacent the side of the vehicle from said second element when the vehicle is in reverse gear; and,
  (iii) for selectively returning said at least one second mirror element to its original position to provide the vehicle operator a planer view, directly rearward of the vehicle, from both said elements when said vehicle is removed from reverse gear.

* * * * *